J. SELBY.

Grain Drill.

No. 457. Reissued Apr. 21. 1857.

N. PETERS, PHOTO-LITHOGRAPHER, WASHINGTON, D. C.

UNITED STATES PATENT OFFICE.

JAMES SELBY, OF LANCASTER, OHIO.

IMPROVEMENT IN SEED-DRILLS.

Specification forming part of Letters Patent No. 13,105, dated June 19, 1855; Reissue No. 457, dated April 21, 1857.

*To all whom it may concern:*

Be it known that I, JAMES SELBY, of Lancaster, in the county of Fairfield and State of Ohio, have invented a new and Improved Seed-Drill; and I do hereby declare that the following is a full, clear, and exact description of the same, reference being had to the annexed drawings, making a part of this specification, in which—

Figure 1:
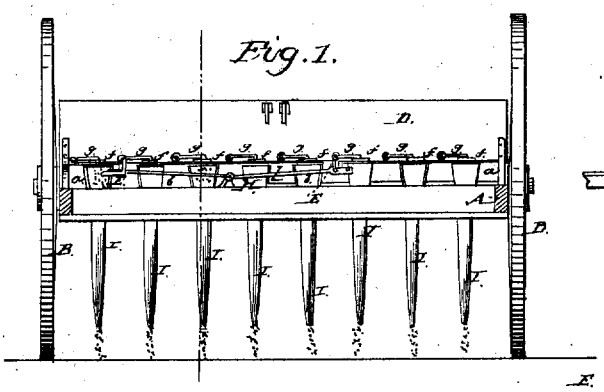
Figure 2:
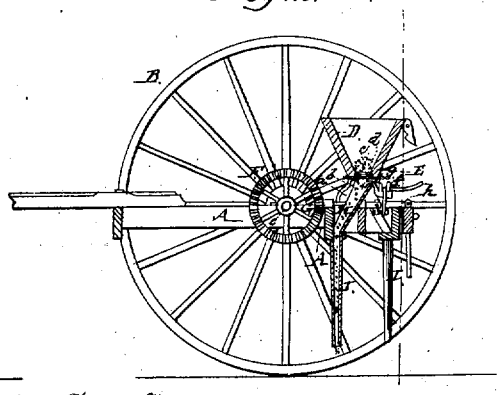
Figure 3:
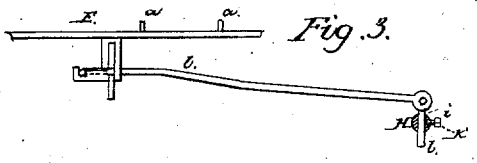
Figure 4:
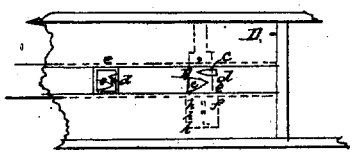
Figure 5:
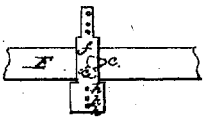
Figure 6:
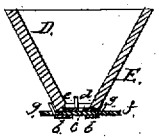

Figure 1 is a back view of my improvement. Fig. 2 is a transverse vertical section of the same, the plane of section being through the center. Fig. 3 is a detached view of the adjustable crank and one of the connecting-rods and sliding bar. Fig. 4 is a plan or top view of a portion of the hopper. Fig. 5 is a detached view of one of the transverse slides underneath the hopper. Fig. 6 is a transverse section of the hopper.

Similar letters of reference indicate corresponding parts in the several figures.

The nature of my invention consists in the peculiar means or device employed for distributing the seed, said means or device being arranged and operated as will be hereinafter fully shown and described.

To enable others fully skilled in the art to understand and construct my invention, I will proceed to describe it.

The general form of the drill is similar to many in use. A rectangular frame, A, is supported by two wheels, B B, the axle C of the wheels extending across the frame and working in suitable bearings thereon.

D is the hopper, of the usual form, equal in length to the width of the frame, as shown in Fig. 1, the hopper being supported by metallic rods or bars *a*, which are attached to the frame so as to leave a suitable space between the bottom of the hopper and the frame.

To the under surface of the bottom of the hopper D there are attached two plates, *b b*, one at each side, (see Figs. 2 and 6,) on which two reciprocating slides, E, work. The inner ends of the slides meet at the center of the hopper, which is provided with a partition. The slides E have elliptical-shaped apertures *c* made through them, as shown clearly in Figs. 4 and 5, the apertures being made through the slides in pairs—that is, two near together—the end of one overlapping or passing the end of the adjoining one, and a requisite space or distance is allowed between the pairs of apertures. (See Fig. 4.) Between the pairs of apertures—that is, between each two forming a pair—there is placed a vertical pin, *d*. (Shown in Figs. 2, 4, and 6.)

The bottom of the hopper D is perforated with rectangular openings *e*, through which the pins *d* project, the apertures *c* in the slides being underneath the openings *e*. Underneath the apertures *c* in the slides E there are placed transverse slides *f*, which are of unequal breadths, as shown in Figs. 4 and 5; or they may be of regular taper form. These slides *f* are fitted in recesses in the bottom edges of the hopper and rest or slide upon the plates *b b*, the slides being secured at desired points by hooks *g*, (see Fig. 1,) which are attached to the back side of the hopper, the points of the hooks passing through holes *h* in the slides *f*. (See Figs. 4 and 5.) The use of this slide is to enlarge or contract by its proper adjustment the openings *c*, and thus regulate the quantity of seed discharged. The same may be done by other equivalent contrivances attached underneath to the bottom of the hopper.

On the axle C of the wheels B B there is attached a bevel-wheel, F, which gears into a bevel-pinion, G, at one end of a small shaft, H, underneath the hopper D. (See Fig. 2.) The opposite end of the shaft H has a slot, *i*, made through it, in which a small bar, *j*, is fitted and secured therein at the desired point or distance by a set-screw, *k*. (See Fig. 3.) To the outer end of this bar *j* two connecting-rods, *l l*, are attached, which rods are connected to the slides E E, one to each. (See Fig. 1.)

Underneath the hopper D there are attached the usual conveying-tubes, I, as shown in Fig. 1.

As the machine is drawn along, the wheels F G rotate the small shaft H, and the bar *j*, which is a crank, of course operates the rods *l l*, and a reciprocating motion is given the slides E, and the stroke may be made greater or less by adjusting the bar *j* farther in or out from the shaft H, the set-screw *k* securing said bar at the proper point. The seed in the hopper D passes through the openings *e* and through the apertures *c* in the slides E into the tops of the conveying-tubes I. The slides *f* regulate the quantity of seed discharged according as they are placed underneath the apertures *c*. For instance, if the narrow parts are underneath the apertures there is considerable space allowed for the escape of seed, and the space is contracted if the broader portions are underneath the apertures. The slides are secured at the proper points by the hooks *g*, and instead of being formed with portions of different breadths they may be of a regular taper form. The elliptical form of the apertures *c* side by side, or their ends passing each other, prevent the crushing of the seed or the breaking of the same against the sides or edges of the openings *e* in the bottom of the hopper, and the pins *d* stir or agitate the seed and prevent it from clogging in the openings and apertures.

Having thus described my invention, what I claim as new, and desire to secure by Letters Patent, is—

The regulating at pleasure the quantity of seen discharged by means of the transverse slides *f* or their equivalent, in combination with the reciprocating slides E, as herein shown and described.

JAMES SELBY.

Attest:
T. EWING,
G. STEINMAN.